United States Patent [19]

Kahn et al.

[11] 4,451,827
[45] May 29, 1984

[54] LOCAL AREA COMMUNICATION NETWORK

[75] Inventors: Steven A. Kahn, Silver Spring; Robert L. Stewart, Wheaton; Stephen G. Tolchin, Rockville, all of Md.

[73] Assignee: The Johns Hopkins University, Baltimore, Md.

[21] Appl. No.: 304,636

[22] Filed: Sep. 22, 1981

[51] Int. Cl.³ .............................................. H04Q 9/00
[52] U.S. Cl. ................................. 340/825.52; 370/60; 370/94; 340/825.5
[58] Field of Search ...................... 340/825.52, 825.02, 340/825.05, 825.5; 370/24, 26, 29, 32, 60, 92, 94; 179/18 EA

[56] References Cited

U.S. PATENT DOCUMENTS

| | | | |
|---|---|---|---|
| 4,156,798 | 5/1979 | Doelz | 370/94 |
| 4,201,891 | 5/1980 | Lawrence et al. | 179/18 EA |
| 4,347,498 | 8/1982 | Lee et al. | 370/60 |
| 4,380,063 | 4/1983 | Janson et al. | 370/60 |

OTHER PUBLICATIONS

"Data Processing-Open Systems Interconnection-Basic Reference Model", ISO/TC 97/SC16/N537 (DP 7498), American National Standards Institute, N.Y., N.Y.

Primary Examiner—Donald J. Yusko
Attorney, Agent, or Firm—Robert E. Archibald; Leonard W. Pojunas, Jr.

[57] ABSTRACT

A communications network for providing full-duplex data transfer between any two network interface units on a one-to-all-others contention bus. Network interface units (NIUs) send and receive data signals on outgoing and incoming links, respectively, which are connected to junction boxes which couple the incoming link connected to one network interface unit to the outgoing links of only the other NIUs. The data signals have source address codes and destination address codes applied thereto, which codes are examined by each NIU receiving a data signal to determine (1) if the NIU will accept the data signal for processing and (2) if full duplex data transfer is occurring. Transmission of all data signals in the network is temporarily aborted when any two NIUs are transmitting data signals and at least the signal transmitted by one of the NIUs is not addressed to the other NIU.

27 Claims, 6 Drawing Figures

LOCAL AREA COMMUNICATION NETWORK

STATEMENT OF GOVERNMENTAL INTEREST

The Government has rights in the invention pursuant to Contract No. N00024-81-C-5301 awarded by the Department of the Navy.

TECHNOLOGICAL CONTEXT OF THE INVENTION

In recent years, the growing diversity and dispersion of the computer user community has rendered the previous large, costly centralized computer systems unable to satisfy the various specific needs of the community. Various naturally distributed user environments, such as college campuses, ships, military bases, laboratory or office complexes, or medical centers, have, in particular, underscored the shortcomings of the centralized computer system. Accordingly, a trend directed toward the decentralization of computing devices has resulted. Unfortunately, such decentralization has led to restricted communications and reduced cooperation among users which has impeded systems development, has caused duplication of effort, and has increased costs.

In an attempt to realize the benefits and eliminate the problems associated with a decentralized system, considerable interest in the development of distributed data processing concepts and in the local area communication network concept has been shown. The local area communication network serves users who are geographically co-located within a few kilometers, providing support to distributed data processing sites in naturally distributed environments. In addition, the local area communication network may also improve the availability and reliability of resources (through redundance) and access to data; can provide comprehensive support for flexible integration of heterogeneous, but related, systems; can provide modularity as a basis for incremental systems development; and may achieve cost reduction and performance improvements through resource sharing.

In prior and contemporaneous technology, the general concept of networking has developed. In U.S. Pat. No. 4,063,220 by Metcalfe et al., apparatus for enabling communications between two or more data processing stations is disclosed. In particular, the patent teaches a system wherein a plurality of user devices direct information to and receive information from a common bus. Interposed between each user device and the bus is a corresponding interface and a transceiver. Each transceiver includes, in addition to the usual transmitter and receiver sections, a gate which compares data from the interface stage with data on the bus and indicates whether the two sets of data are equal. When the two sets of data are unequal, an interference between the transceiver and the bus is indicated and the associated transmitter section is disabled. In accordance with this prior patent, a transmitter section will be inhibited until no other transmissions are present on the common bus. In accordance with the Metcalfe et al. teachings, only one transmitter section associated with one user device can enter data onto the common bus at any given time.

In a related patent to Boggs et al., U.S. Pat. No. 4,099,024, a communications network repeater which matches or amplifies data signals from a common bus and redirects such signals onto the bus after the matching or amplifying is disclosed. According to the Boggs et al. patent, the repeater has two ports at either end of the repeater. Data signals can enter either port of the repeater, can be matched or amplified, and then exit the repeater at the opposite port. In this patent, although the repeater is described as "bi-directional", it is indicated that the repeater will determine in which direction to repeat the information which enters it. That is, while characterized as "bi-directional", the repeater set forth by Boggs et al. apparently provides for only one-way communication at any given time. In accordance with the description in the patent, one port is defined as the incoming port and the other port defined as the repeater port. Data enters the incoming port, is matched or amplified, and exits the repeating port. If a data signal enters the repeating port, a collision is detected and an appropriate signal is passed "back into the incoming segment by the incoming port transceiver transmitter and ... the using device already transmitting the data packet is caused to cease transmission." As in the related Metcalfe et al. patent, the Boggs et al. reference considers the benefits of local area communications networks, but is limited in bandwidth by permitting only one-way communication between user devices.

In another communications system, Hopkins et al. in U.S. Pat. No. 4,161,786 teach a time division multiplex access communications system which includes a plurality of terminals coupled to a common bus. In one form of the Hopkins et al. invention, subscriber terminals distributed along the common bus contend for access to the bus. In particular, the various subscriber terminals may enter data onto the bus during sequential slotted time intervals. The various data signals are carried on the bus to a connector network at a central location. According to this form of the Hopkins et al. invention, "the connector detects signal collisions (from two or more terminals) in the various time slots on the inbound path, and when such a collision is detected, the connector network inhibits the transfer of signals from the inbound path to the outbound path." If there is no collision, the connector network directs the incoming signal onto an outbound path which is monitored by each of the terminals which contends for the bus. In the reference, it is indicated that "each terminal with the contention capability is operative to transmit a message signal in the slots on the inbound path and then monitors the outbound path to detect the presence of that transmitted signal." Accordingly, full duplex communication between any two subscriber terminals is not possible.

Referring to U.S. Pat. No. 4,017,149 by Kao and U.S. Pat. No. 4,019,176 by Cour et al., network ring systems are disclosed. Kao teaches a multiple access fiberoptical bus system having a plurality of fibers used as transmission lines in a closed-loop system. In accordance with the Kao reference, multiple access to the bus is provided where each terminal has access to all other terminals. In addition, terminals may be added, removed, or replaced with ease, and the failure of one terminal will not affect bus operation or cause system failure. In describing the loop configuration on which the system in the Kao reference is based, reference is made to the accessing of a bus line through "tee" couplers and "star" couplers. With reference to the "tee" couplers, it is stated that such couplers are limited in that only down-the-bus operation is provided. That is, terminals at the beginning of the bus can communicate only with terminals which are down the bus route, terminals downstream being unable to communicate with terminals at the beginning of the bus. The "star" coupler is described as having a mixer which interconnects all terminals to each other. In particular, all input and output lines terminate at a point such that a signal from any input line is transferred to all the lines terminating at the point. It was pointed out that, should the "star" coupler be damaged, the total system would fail. To overcome the system failure problem, the invention disclosed in U.S. Pat. No. 4,017,149 employs a plurality of redundant loops with "star" couplers. Thus if one mixer fails, a terminal will be connected to other terminals by one or a plurality of mixers which have not failed. While achieving many benefits by using fiberoptics and while overcoming problems in the prior technology, the invention in U.S. Pat. No. 4,017,149 does not specify a system in which full duplex communication in a one-to-all-others broadcast system is provided. In U.S. Pat. No. 4,019,176, another ring system is discussed wherein stations are interconnected by a single common transmission channel which forms a loop. According to this Cour et al. reference, the channel provides all messages to all active stations essentially simultaneously. However, because of its looped architecture, the channel will continuously circulate the message to the various stations until the message circulation is blocked by the station that is transmitting. As with the Kao reference, the Cour et al. reference fails to teach a full duplex mode in which any two stations can transmit and receive simultaneously between each other.

U.S. Pat. No. 4,027,153, like U.S. Pat. No. 4,017,149, teaches a fiberoptic network which provides transmission of data between and among a plurality of subscriber stations, each station having a transmitter and a receiver. In this patent to Kach, information is sent out by a transmitter of one station and is passed via a coupling element to all the receivers, but is accepted only by the station programmed to a particular address. This reference disallows the possibility of full duplex operation by disconnecting the receiver of a given station as soon as the transmitter of that station starts to operate. The invention of Kach thus precludes full duplex data transfer between any two stations.

In the above-discussed patents, the benefits of local area communications networks have been suggested. Also, the desirability of maximum communication between stations or terminals has also been suggested.

The development of a communications network which provides full duplex communication between any two user devices or terminals on a contention bus has, however, not been contemplated by the cited references. Accordingly, the benefits of increased bandwidth and diminished delays in full duplex data transfers between two devices are not achieved.

In interconnecting a user device, terminal, peripheral or other host to a network bus, several previously taught networks provide a network interface unit. It will be noted, however, that such network interface units are limited in intelligence and depend, for the most part, on the computing facilities of each host for most data processing functions. Thus, prior network implementations provide only a low level of protocol support for the various users or subscribers in the network. (The following reference defines protocol and indicates the differences between low level protocols of prior networks and the high level protocols of the present invention: "Data Processing—Open Systems Interconnection—Basic Reference Model", ISO/TC 97/SC16/N537 (DP7498), American National Standards Institute, N.Y., N.Y.) The potential benefits of heterogeneous digital system integration and distributed processing are, therefore, largely unrealized. In addition, limiting network support to low level protocols generally translates into higher costs for new users or subscribers.

The prior networks, while representing a marked advance in technology, may not provide the flexibility and extensibility sometimes required and may not support comprehensive, distributed data communications among heterogeneous devices.

SUMMARY OF THE INVENTION

In developing a local area communications network of greater flexibility and capabilities, the present invention provides a one-to-all-others broadcast contention bus which permits full duplex communication between any two network interface units to which terminals, computers, or other hosts may be connected. In achieving this objective, the present invention includes a plurality of network nodes, each of which comprises a corresponding network interface unit and at least an incoming communication link, but preferably a pair of communication links, namely an incoming link and an outgoing link. Such incoming and outgoing links represent link pairs, each link pair connecting a corresponding network interface unit (hereafter referred to as NIU) to the rest of the network. The incoming link of a link pair carries data signals from the network to the corresponding NIU while the outgoing link carries data signals from the NIU to the network. The communication links of each link pair are, at one end, connected to an NIU and, at the other end, to a junction box of the network. The junction box is designed so that data signals transmitted on the outgoing link of any network node will enter the incoming link of every other network node but will not enter the incoming link of the network node from which the transmission originates. That is, a transmission from a network node will be broadcast to the other network nodes but not back to itself.

The present invention provides a plurality of input and output ports in each junction box into which NIUs can be "plugged in" or removed. By simply connecting the incoming links and outgoing links of a network node to the output and input ports, respectively, of a junction box, such network node can be coupled to the other network nodes connected to the junction box.

It is further contemplated that more than one junction box may be provided. The various junction boxes are then interconnected by providing two oppositely directed communication links similar to those provided between an NIU and a junction box. As with the coupling of the NIU to the junction box, the interconnection of the junction boxes is also in accordance with a one-to-all-others design. In fact, the junction box itself may comprise a plurality of input and output port pairs into which either the link pairs connected to a network interface unit or the two communication links of another junction box may be coupled. Thus, in accordance with the invention, a plurality of network nodes may be coupled to a junction box and a plurality of junction boxes may be interconnected. In this way, a data signal from a network node connected to one junction box may be transferred, via one or more other junction boxes, to a network node connected to another junction box.

The present invention contemplates the use of coaxial cable communication links. However, such links have exhibited shortcomings in certain applications. For example, it may be difficult to install a large coaxial cable in an existing facility. Also, such links can be readily monitored externally, thereby providing a lack of physical security over the transmission medium. Further, signal noise and interference may preclude the efficient communication of information between two subscribers linked to the bus. Thus, while the principles of the invention apply to coaxial cables, twisted pairs, waveguides and other transmission forms, the present invention, preferably, employs fiberoptic communication links. Fiberoptics provides unique benefits of ground isolation, immunity to electromagnetic interference and static discharges, and immunity to easy tapping or monitoring.

In order to overcome the low level protocol limitations which characterize previously developed networks, the present invention provides intelligent NIUs which are multiple microprocessor-based devices. Each NIU serves as a physical and logical interface to a host on one side and as a manager of distributed data communications exchange between itself and other interface units on the other side. Various layers of communications protocol are supported by the NIU unit to provide extensive communications services between various users or subscribers. In particular, the protocol design for the present invention is effected by protocol modules included within.

Basically, the NIU is a multiprocessor consisting of two microprocessors that communicate through shared memory or a parallel I/O channel. Further, the NIU is comprised of two halves. Each half of the NIU is a distinct microcomputer with its own local bus. Packets of information must be transferred between the halves of the NIU, however, and this occurs through a two-port common shared memory. Hence the two microprocessor buses converge at the shared memory, and an arbiter controls all access to the memory. The shared memory consists of up to three boards of static RAM that can be mapped anywhere in the address space of either microprocessor.

The first, or "host", half of the NIU consists of the host/terminal interface board, the host microprocessor board, and one or more local memory boards. The interface board may contain parallel interface logic for a host access link, or serial interface ports for terminals. One personality PROM per port is provided to the tailor each port to the particular characteristics of each subscriber (for example, ASCII or EBCDIC). The host microprocessor board contains, in addition to one microprocessor, encryption/decryption logic for data security, a parallel interface to the network microprocessor board, and a counter/timer chip for timing events such as message time-outs. Each local memory board provides PROM for the program and some RAM for local buffering and stack.

The second, or "network", half of the NIU is made up of the network interface board, the network microprocessor board, and one or more local memory boards. A transmitter and receiver are located on the interface board, as well as abort and carrier-detect logic, plus Manchester encoding and decoding logic. The Manchester encoding applies clocking information to the bit stream. The second microprocessor resides on the network microprocessor board, along with a link control chip, DMA interfaces for transferring data in both directions between the data link chip and shared memory, a parallel interface to the host microprocessor board, and a counter/timer chip.

The NIU is capable of supporting many of the communications functions that have previously been allocated to the host computers themselves. By embedding high-level data communications protocols within the NIU and by providing a distributed communications control architecture for a network of heterogeneous computers and other devices, the present invention overcomes many of the problems and limitations found in the prior network technology.

With the one-to-all-others broadcast contention bus and the above-described network interface units, various significant system advantages and capabilities are achieved. Specifically, the following capabilities are realized: full logical connectivity of diverse subscribers; distributed control of access to network bandwidth; efficient, correct, and secure information exchange; high throughput rate with various modes of data exchange; a nominal process-to-process management ability; and improved control and maintenance of communications software by location of such software within the NIUs rather than as distinct representations within the host.

It is thus an object of the present invention to improve on the prior communications networks by (1) permitting full duplex communications between any two subscribers, (2) providing an intelligent NIU for coupling any of a variety of hosts to a junction box, (3) permitting the easy addition or removal of NIUs to a junction box, (4) providing one or a plurality of interconnectable junction boxes for coupling NIUs connected to different junction boxes and (5) facilitating the addition of new host types to the network.

Further, it is an object of the present invention to include: (1) a branching contention bus that is reliable, easily reconfigurable, and has distributed control and (2) a highly intelligent NIU which supports many of the communications functions that until now have predominantly been supported by the host computers themselves. This results in increased utilization of bandwidth and concurrent data exchange which can support a distributed processing environment.

DESCRIPTION OF THE INVENTION

Figure 1:
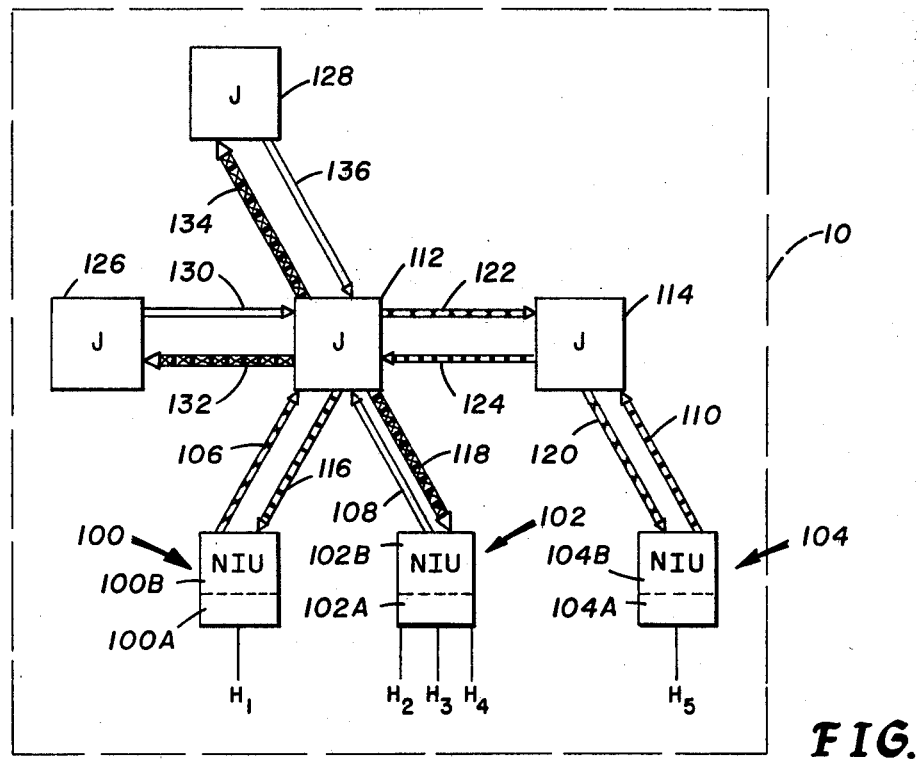
FIG. 1 is a general block diagram showing a communications network in accordance with the present invention.

Referring to FIG. 1, a communications network 10, in particular a local area communications network, is shown. In particular, three network interface units (hereafter referred to as NIUs) 100, 102, and 104 are shown interposed between various hosts (indicated by subscripted H's). Such hosts may comprise computer terminals, a CPU, a line printer, a phototype setter, or various other computer or, communication devices that may be incompatible but may need to communicate.

The purpose of each NIU is to interface a host connected thereto with the hosts connected to other NIUs in the network. Among other things, the NIU determines if a received data signal is intended to be directed to the connected host and reformats data signals so that intercommunications between hosts providing data signals of different forms can be effected. In short, data signals emanating from and ultimately destined for a host pass through a corresponding NIU.

As seen in FIG. 1, each NIU has two halves. The first half, or the "host" half, shown as 100A, 102A and 104A of the respective NIUs, each includes the hardware and protocol firmware required to accommodate the specific characteristics of a given host. The other half, or the "network" half, designated as 100B, 102B and 104B, respectively, relates specifically to the transfer of data signals between NIUs. The network halves of the NIUs 100, 102, and 104 are shown having outgoing links 106, 108, and 110, respectively which carry data signals away from the NIU. For example, a data signal emanating from the host $H_1$ and passing through the corresponding NIU 100 exits the NIU 100 through a corresponding outgoing link 106. In the representative embodiment of FIG. 1, outgoing links 106 and 108 enter a junction box 112 while the outgoing link from NIU 104 enters a junction box 114. The NIU's 100, 102, and 104 also are connected to incoming links designated as 116, 118, and 120, respectively. As is readily seen in FIG. 1, the outgoing link and incoming link for each NIU comprise a link pair which connects the NIU to a single junction box. Each link pair and its corresponding NIU is referred to as a "network node", although a network node may also comprise an NIU and just an incoming link. A plurality of NIUs may be connected to a given junction box as is demonstrated by the coupling of both NIU 100 and NIU 102 to the junction box 112. However, in accordance with the invention, more than one junction box cannot be connected to a single NIU.

In order that one NIU, such as NIU 100, which is connected to one junction box, such as junction box 112, can communicate with an NIU, such as NIU 104, which is connected to another junction box, such as junction box 114, two oppositely directed communication links between the two junction boxes are provided. For example, between junction box 112 and junction box 114 are links 122 and 124. Similarly, junction boxes 126 and 128 are interconnected with junction box 112 via the communication links 130, 132 and 134, 136, respectively. The embodiment shown in FIG. 1 illustrates that a given junction box can be connected to a plurality of NIUs or junction boxes. This characteristic is significant in that NIUs or other junction boxes can be added to or removed from a particular junction box with relative ease.

Figure 2:
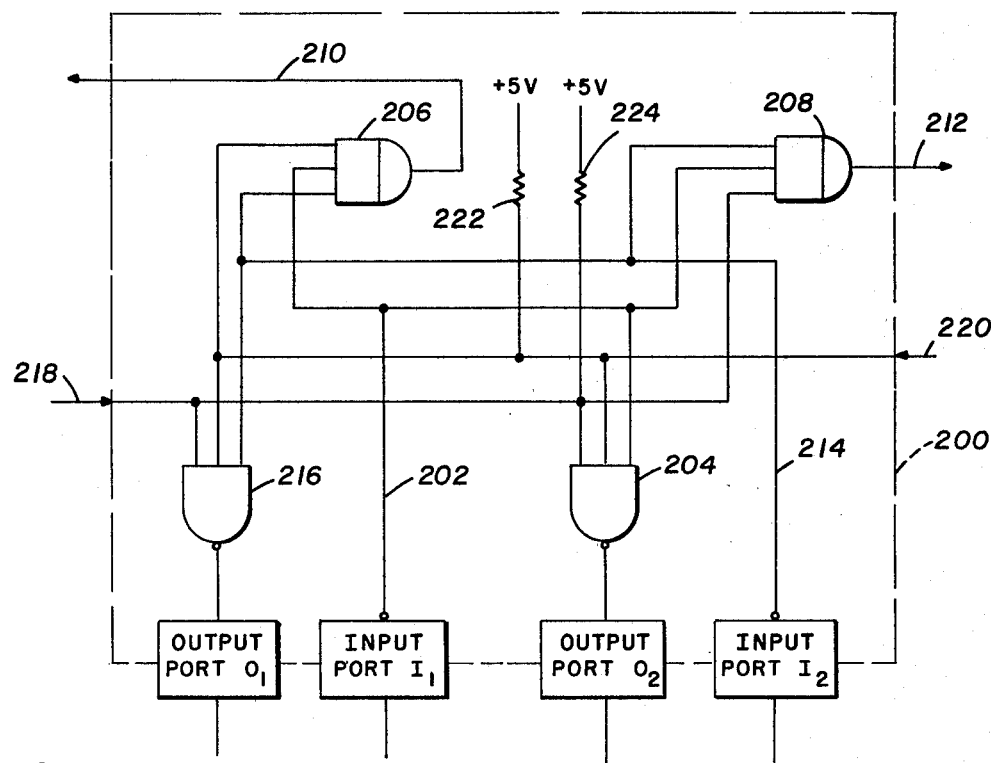
FIG. 2 is a circuit diagram showing a junction box used in a communications network of the present invention.

Referring now to FIG. 2, the circuitry of a sample junction box board 200 is shown. A typical junction box, such as junction box 112, consists of a plurality of junction box boards combined to form a multiple port junction box. Within the junction box board 200, are two paired input and output ports ($I_1$, $O_1$) and ($I_2$, $O_2$), each pair of which can accommodate a link pair from a corresponding NIU or the oppositely directed communication links of another junction box. For example, the outgoing link of a first link pair can be connected to the input port $I_1$, and the incoming link of that link pair can be connected to the output port $O_1$. Similarly, the outgoing link of a second link pair can be provided to input port $I_2$, with the incoming link of such second link pair being connected to the output port $O_2$. The relation of the input ports and output ports is made significant by various gates included within the junction box boards 200. Briefly, the gate configuration provides that a data signal entering a given input port is conveyed to every output from the junction box, such as junction box 112, other than the output port to which the given input port is paired. Specifically, a data signal entering input port $I_1$ will proceed along a line 202 and will be directed to a gate 204 which will pass the signal from the input port $I_1$ to the output port $O_2$. Likewise, a data signal entering the input port $I_2$ will proceed along line 214 to a gate 216 which will pass the signal entering the input port $I_2$ to the output port $O_1$. This data signal will also pass through gates 206 and 208 to the adjacent junction box boards, if such are provided. In no instance is a data signal which enters input port $I_1$ directed to the gate 216; the directing of a data signal from the input port $I_1$ to the output port $O_1$ thus being precluded. Similarly, a data signal entering the input port $I_2$ cannot exit through the output port $O_2$.

As already noted, the data signal entering the input port $I_1$ or $I_2$ will also enter gates 206 and 208 which, along lines 210 and 212, provide the data signal to adjacent junction box boards. In the reverse, data signals entering from either adjacent junction box board (not shown) along lines 218 or 220, respectively, are connected to the input lines of gates 204 and 216 and will, accordingly, pass to the output ports $O_2$ and $O_1$, when such data signals are provided. Either input port $I_1$ or $I_2$, it should be realized, may couple to a communication link of another junction box as well as to a corresponding outgoing link of a link pair. Similarly, either output port $O_1$ or $O_2$ may couple to a communication link of another junction box as well as to an incoming link of a link pair. In either case, the output ports $O_1$ or $O_2$ are isolated from the data signals entering their paired input ports $I_1$ or $I_2$, respectively. A data signal entering the junction box board 200 from a second junction box board within the same junction box, will thus not be directed back into that same second junction box board. This is shown in FIG. 2 where a data signal on line 220 does not enter the gate 208 and is not provided along line 212 back to the junction box board from which the signal came. Accordingly, if a digital data signal arrives at any input port of a junction box, such as junction box 112, the data signal is gated and provided to all the output ports except the output port paired with the input port on which the data signal arrived.

Where the various links (shown in FIG. 1) comprise fiberoptic elements, the input ports $I_1$ and $I_2$ and output ports $O_1$ and $O_2$ would include opto-electrical converters. The optical data signal received at the input port $I_1$ or $I_2$ would be converted to an electrical form before entering the appropriate one-to-all-others gating arrangement. Where the communication links are twisted pair or coaxial cable links, the input and output ports may simply comprise a corresponding "plug".

Although not required, the signal distribution within the junction box, such as junction box 112, is preferably accomplished with TTL logic. In particular, in the fiberoptic embodiment, a fiberoptic transmitter (not shown) at each output port converts TTL electrical signals to light with a wavelength of about 830 nm. A TTL high ("1") corresponds to a light-on condition, and a TTL low ("0") corresponds to a no-light condition. A fiberoptic receiver (not shown) at each input port converts the light signals received from a fiberoptic cable (not shown) into TTL electrical signals, with light-on corresponding to a high TTL level ("1") and light-off corresponding to a low TTL level ("0"). It will also be noted that the gates 206 and 208 which guide data signals from the input ports of one junction box board to adjacent junction box boards in the same junction box are open-collector gates. Due to the effects on voltage caused by the open-collector gates, two pull-up resistors 222 and 224 are provided to adjust the voltage inputs received from adjacent junction box boards which employ such open-collector gate logic.

Referring again to FIG. 1, the operation of the junction box in the overall network becomes evident. A signal on incoming link 106 will enter the junction box 112 and will thereafter exit the junction box 112 along the outgoing link 118. The signal will also be carried to junction boxes 114, 126 and 128 along links 122, 132 and 134, respectively. When the signal enters junction box 114, it will, as discussed with reference to FIG. 2, pass through a gating arrangement which directs the signal to the incoming link 120. The manner in which the signal on the outgoing link 106 is dispersed to the various junctions and NIUs is shown by x's provided along the various links which carry the data signal coming from the NIU 100. For example, the incoming links 118 and 120 which direct data signals into NIU 102 and NIU 104, respectively, carry the data signal from the outgoing link 106. Most importantly, however, it should be noted that the incoming link 116 to NIU 100 does not carry the data signal carried on the outgoing link 106. As discussed with reference to FIG. 2, the data signal carried on outgoing link 106 is directed to all other NIUs and not back to the sending NIU.

If at the same time that outgoing link 106 is carrying a signal the outgoing link 110 of NIU 104 also provides a data signal (shown with a dashed representation), the "one-to-all-others" architecture will require that the data signal from the outgoing link 110 enter the links 124, 118, 116, 132 and 134. When both outgoing links 106 and 110 are transmitting data signals, the two data signals will become superimposed on the incoming link 118 to NIU 102, as well as on the communication link 132 and the communication link 134. This is shown by the interspersing of x's and dashes on these links. The significance of the data is lost by such superimposition. In the case of a fiberoptic embodiment, each particular output port O₁, for example, receives the output signal from a gating arrangement which ORs the signals converted from optical to electrical form at all input ports other than the input port (I₁) which is paired with the particular output port. Therefore, if two NIUs address signals to the same NIU at the same time, a superimposition of the two optical signals will be detected at a fiberoptic receiver of the destination NIU. The two optical signals are superimposed in much the same way that two radio transmissions carrying digital data on the same frequency would interfere with each other to produce a meaningless signal.

It will be noted in FIG. 1 that the incoming links 116 and 120 of NIU 100 and NIU 104, respectively, carry only one data signal, namely the signal conveyed from the other NIU. Accordingly, NIU 100 can convey a readable data signal to NIU 104 while, at the same time, NIU 104 is communicating data to NIU 100. It should, of course, be noted that NIU 100 and NIU 102 (or any other two NIUs) may also communicate with each other simultaneously, or in full duplex, as desired. This independent, two-way communication between any two NIUs is a natural consequence of the one-to-all-others architecture previously considered with reference to FIGS. 1 and 2. The ability to provide such full duplex communication increases the bandwidth and may increase the throughput of the network.

Figure 3:
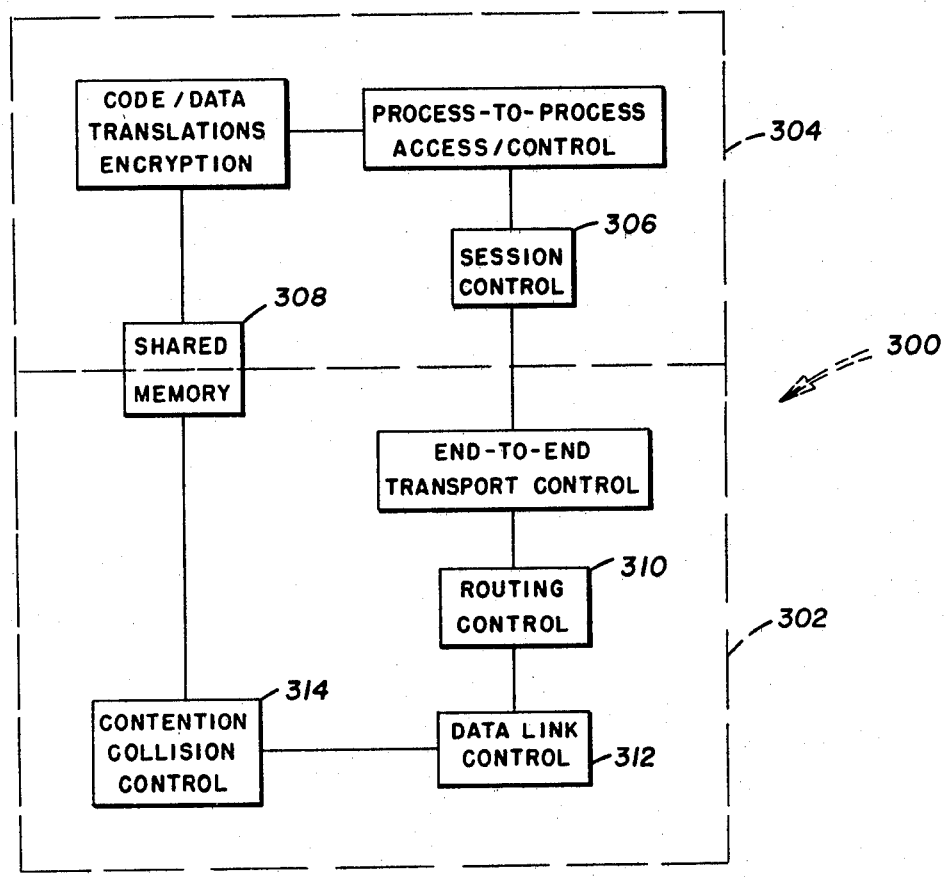
FIG. 3 is a general block diagram of the network interface unit in terms of protocol design in accordance with the present invention.

As depicted in FIG. 1 and FIG. 2, full duplex communication between two NIUs such as NIU 100 and NIU 104 can be realized by the present invention. However, in accordance with the present invention, full duplex communication does not necessarily result each time two NIUs are transmitting simultaneously. Accordingly, in order to effect this selective full duplex transfer of information, each NIU is allocated an address code. To achieve full duplex data transfer, each transmitting NIU must intend to transfer its transmitted signal to the other transmitting NIU. In order to achieve this object, the network half of the NIU provides a certain bus contention protocol. A general reference to the element which controls contention collision is shown in FIG. 3. Referring to FIG. 3, the general protocol elements of the network half of the NIU 300 are shown as 302. Also in FIG. 3 are shown the protocol elements residing in the host half of the NIU, designated by the numeral 304. In accordance with the design shown in FIG. 3, communication protocol functions are performed asynchronously by two separate microcomputers. Higher level "management" protocol, such as session control (indicated as 306), and the input and output of messages are implemented by the microcomputer in the host half 304. Through arbitrated use of a shared memory 308, the second microcomputer in the network half 302 controls routing and error-free delivery and receipt of network data packets by means of function elements 310 and 312. The contention collision control element 314 is shown in the network half 302. It is this contention collision control element 314 which provides the basis for full duplex communication between two NIUs.

Figure 4:
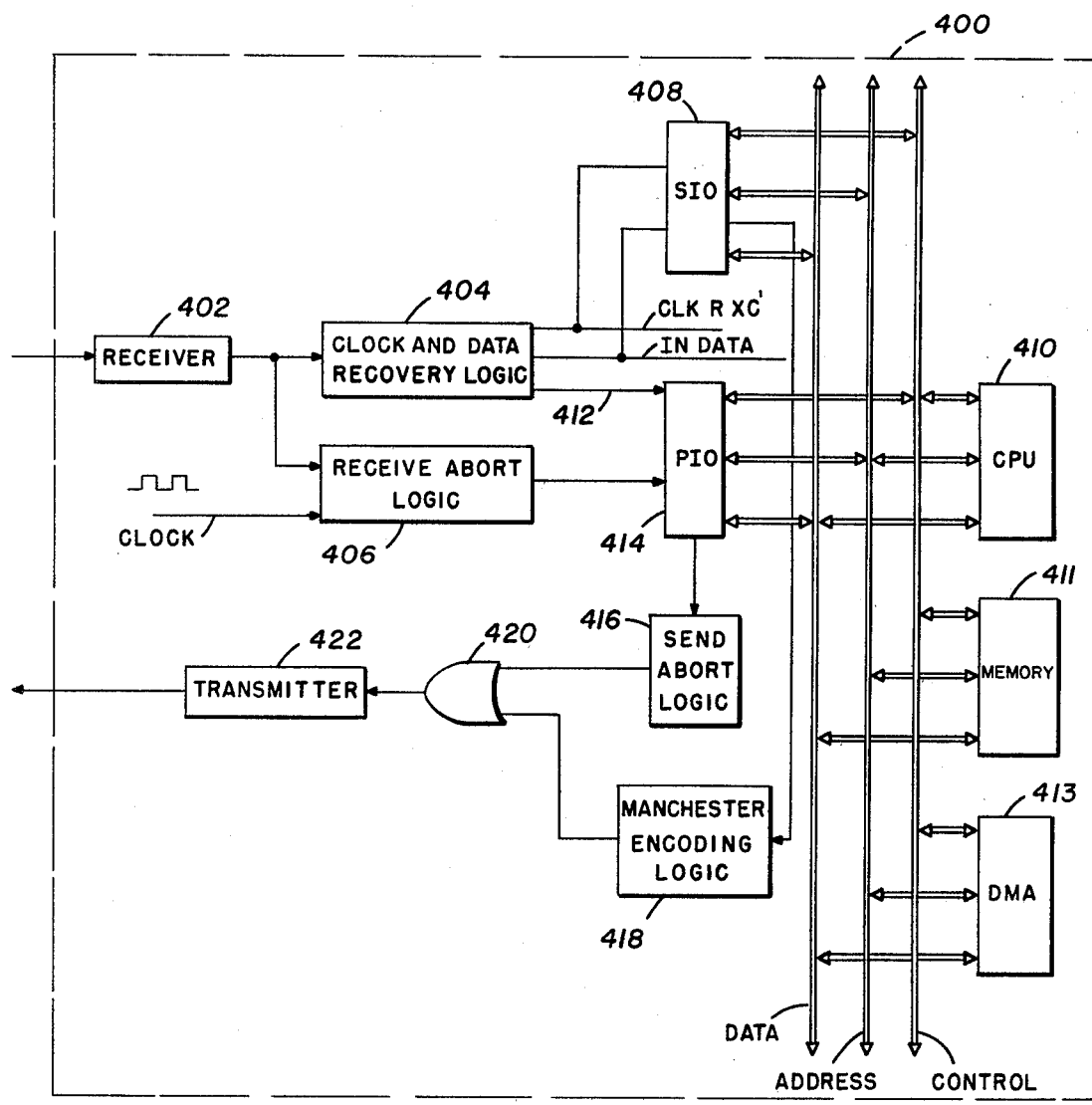
FIG. 4 is a diagram showing, in general, that portion of the network half of the network interface unit relevant to full-duplex communication.

Referring to FIG. 4, hardware is shown which provides various significant functions. First, data entering the NIU is accepted for processing by a CPU within the NIU only if it is addressed to the NIU. Second, logic circuitry is specified whereby the transmission by the NIU to another NIU which is also transmitting is only permitted when the two NIUs are addressing their transmissions to each other. And third, a collision indication signal is provided when two NIUs are transmitting but at least one of the two is not transmitting to the other. The precise manner in which this is accomplished can be noted with reference to FIG. 4. In FIG. 4, a data signal enters the network half 400 of a sample NIU (not identified by reference numeral) at the receiver 402. The sample NIU represents each of the various NIUs in a given network such as that shown in FIG. 1. Where the incoming and outgoing links of the sample NIU are fiberoptic, the receiver 402 will be a fiberoptic receiver. In such a case, the optical signal will be converted to an electrical signal and will exit the receiver and enter a clock and data recovery logic element 404 and a receive-abort logic element 406 simultaneously. The receiver 402, in any case, will adjust the current and voltage levels to be compatible with the characteristics of the logic included in elements 404 and 406. Such logic may, preferably, be TTL logic. The clock and data recovery logic 404 conforms to the conventional Manchester logic which encodes clocking information onto a serial data signal. In Manchester encoding, there is always a mid-bit level transition (low-to-high for a zero bit and high-to-low for a one bit). The receive Manchester logic recovers the clocking information from these mid-bit transitions. The output of the clock and data recovery logic 404 includes the recovered clock and a data input which enter a serial input/output device 408. The data signal entering the receiver 402 will have applied thereto a source address code and a destination address code. The serial input/output element 408 notifies a CPU 410 if the destination address code matches the address code of the particular receiving NIU. If the address code of the particular receiving NIU matches that of the destination address code on the data signal, the data signal will be accepted by the particular NIU. The microprocessor 410 sets a flag in the memory 411 when the destination address code matches the address of the NIU and a direct memory access interface 413 reads the data from the serial input/output element 408 and transfers it to the memory 411.

Because the present invention comprises a contention bus, it is possible for two NIUs to contend for the bus at the same time. As previously discussed, when two NIUs contend for the bus simultaneously for the purpose of communicating with each other, the network permits such full duplex data transfer. The specific manner in which this is performed is illustrated with reference to FIG. 4. When the CPU 410 determines that a message is to be transmitted, it first checks to see if the network (not identified with a reference numeral) is busy. This is done by checking the NETBSY signal on line 412, the NETBSY signal emanating from the clock and data recovery logic element 404 through a parallel interface element 414. This element 414 may comprise a conventional Zilog chip such as the Z80A-PIO. The NETBSY signal is high if the receiver 402 is receiving an input. If the network is not busy, or if the NIU containing the network half 400 is currently receiving a message from the NIU it is attempting to send to, it may begin transmitting its own data signal. This result can be achieved by either a hard wiring technique or a program built into the CPU 410 such as that shown in FIG. 5.

Figure 5:
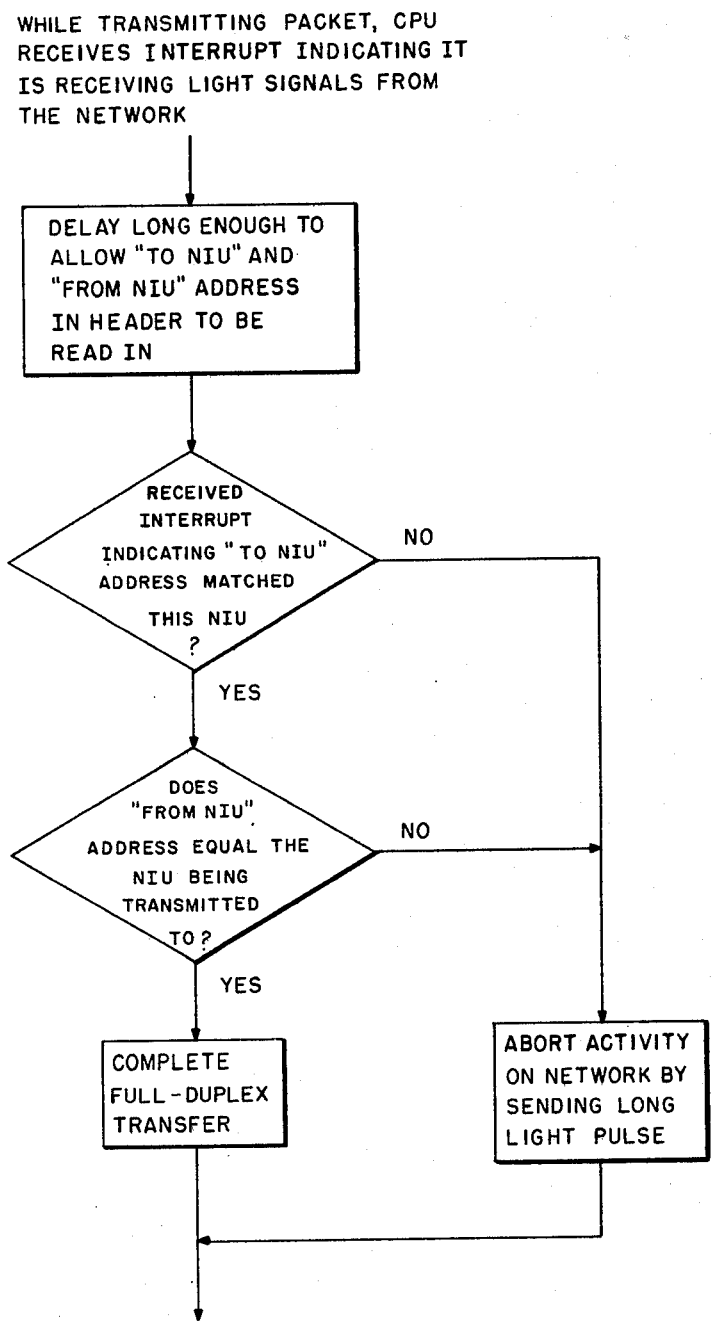
FIG. 5 is a flowchart showing a collision detection algorithm element of a full duplex communications network according to the invention.

FIG. 5 is a flow chart showing a collision detection algorithm for a full duplex communications network. As seen in FIG. 5, the CPU 410 will receive an interrupt while the corresponding NIU is transmitting and a data signal is received at the same time. According to the algorithm of FIG. 5, the CPU 410 will delay long enough to permit the source and destination address codes on the received data signal to be read into the memory 411. If the destination code on the data signal entering the receiver 402 matches the address code of the receiving NIU, the CPU will examine the source address code on the data signal and will determine if the NIU is transmitting to the NIU having an address code which matches the source address code. If, based on these two determinations, the CPU 410 determines that the two NIUs are transferring data signals between each other, a complete full duplex transfer is performed. If, however, either the source address code or the destination address code do not produce a match, an abort signal will enter the network, notifying all NIUs to cease transmission. Referring back to FIG. 4, such a signal will be communicated by the CPU 410 through the parallel input/output element 414 to the send abort logic 416. The output of the send abort logic 416 will be gated with Manchester encoding logic 418 in gate 420, the output of gate 420 exiting the network half 400 at a transmitter 422. The signal from the send abort logic element 416 will enter the receivers 402 of other NIUs, and will enter a receive abort logic element of such other NIUs. This signal indicates to the CPUs in the various NIUs that transmission should be curtailed. A sample software routine for implementing the flowchart of FIG. 5, with particular hardware, is set forth in the Appendix.

The "host" half 304 of the NIU (not shown in detail) consists of a host/terminal interface board, a host microprocessor board and a local memory board. The interface board may contain parallel interface logic (such as DEC or NTDS) for a host access link, or up to four RS232 serial interface ports (e.g., for terminals). One personality PROM per port is provided to tailor the NIU to the particular characteristics of each subscriber (e.g., ASCII or EBCDIC). The host microprocessor board contains in addition to a microprocessor like the Z80, the encryption/decryption logic for data security, a parallel interface to the network microprocessor board, and a counter/timer chip for timing events such as the time a host sends out a data signal. Finally, each local memory board provides, for example, 16K bytes of PROM for programming and some RAM for local buffering and stack. Memory may be expanded by inserting another local memory board, if desired. In accordance with the invention, as suggested by FIG. 3, each subscriber deals with the network through interface logic to effect code and data structure translations (to or from a network standard); to negotiate process, session, and transport options between subscribers; and to deposit or receive data via a common buffer space within the NIU. Each NIU checks access authority; performs host-surrogate process, session, and transport negotiations with a solicitor or respondent NIU; administers contracted protocol services; and controls transfer of data packets between NIUs (in datagram mode) or with the host subscriber (in negotiated mode).

Figure 6:
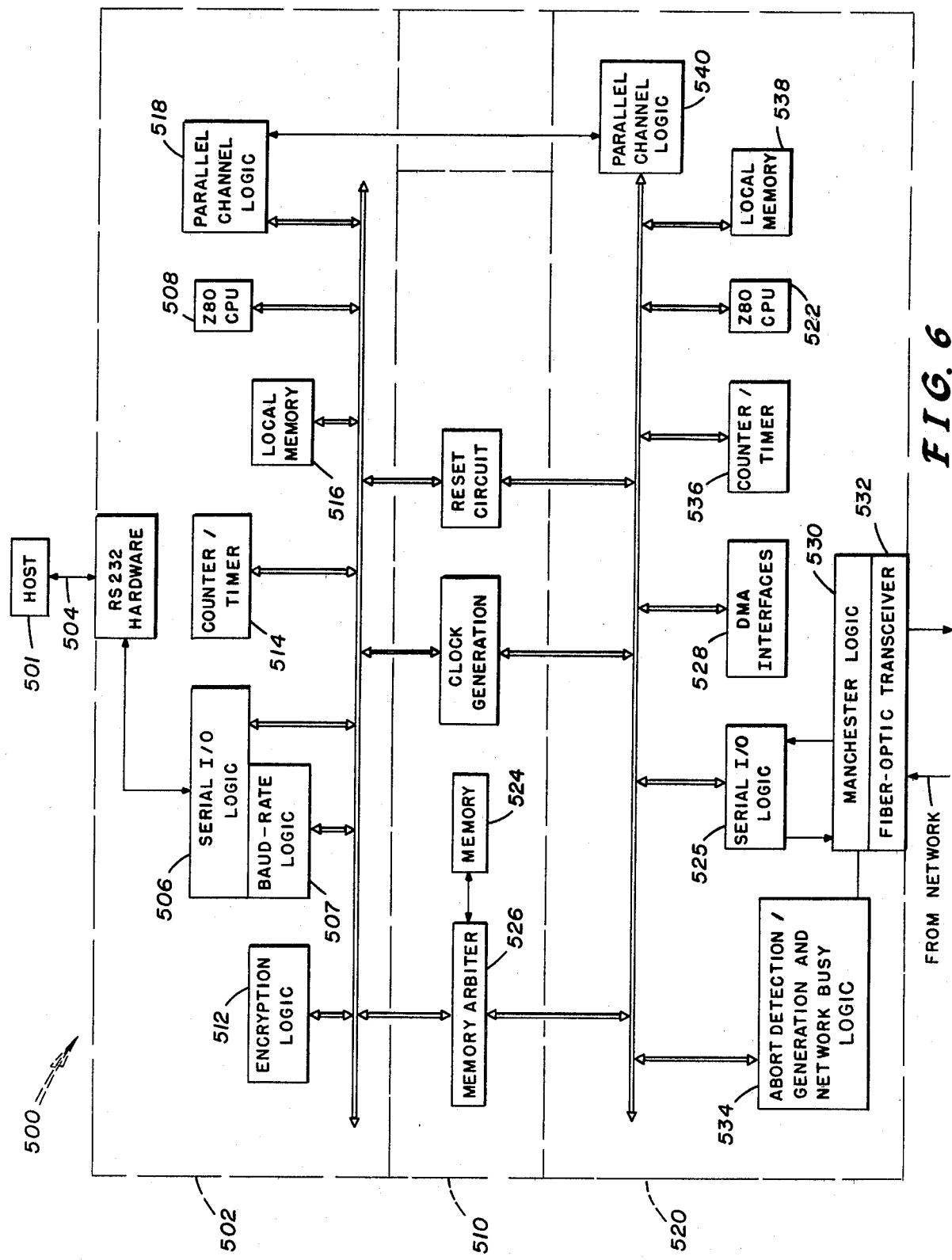
FIG. 6 is a block diagram showing the hardware function modules of a network interface unit.

FIG. 6 shows generally the hardware function modules of a network interface unit 500. In the present embodiment of the NIU 500, data signals pass between the host 501 and the host-half 502 of the NIU 500 according to the conventional RS-232C serial interface standard. Various parallel interfaces between the host 501 and host-half 502 of the NIU 500 may also be used to pass data signals. A conventional RS-232 cable 504 with D-type connectors is employed. The NIU 500 appears as a Data Terminal Equipment (DTE) in the RS-232 nomenclature. A serial input/output chip 506, including baud rate logic 507, in the host-half 502 of the NIU 500 performs serial-to-parallel conversion, and vice versa, and behaves according to the RS-232 asynchronous serial protocol. A CPU 508 on the host-half 502 of the NIU 500 transfers 8-bit bytes of data between the serial input/output chip 506 and shared memory module 510. Encryption logic 512, counter/timer 514, local memory 516, and parallel channel logic 518 in the host half 502 provide necessary functions for supporting a high level protocol implementation.

Data are communicated between the host-half 502 and network-half 520 of the NIU 500 by means of the shared memory module 510. The CPUs 508 and 522 on both halves of the NIU 500 each have access to shared memory 524. A shared memory arbiter 526 permits only one CPU at a time to access the shared memory 524. That is, only one memory write or read can occur at a time. Thus the host-half CPU 508 delivers data from the serial input/output logic 506 to the network-half 520 of the NIU 500 via the shared memory 524. The host-half CPU 508 sets a flag in memory 524 to notify the network-half CPU 522 that it has data available. In the reverse direction, data received from the network (not shown) are deposited from the serial I/O logic 525 via direct memory access interface 528 into shared memory 524. The network-half CPU 522 then notifies the host-half CPU 508, by means of a flag set in shared memory 524 that it has data available. Manchester logic 530 comprises the element 418 and a portion of 404 of FIG. 4; the fiberoptic transceiver 532 comprises the elements 402 and 422 of FIG. 4; and the abort detection/generation and network busy (NETBSY) logic 534 comprises elements 406, 414, 416 and the remaining portion of element 404 of FIG. 4. The counter/timer 536, the local memory 538, and the parellel channel logic 540 are provided to support lower level protocol functions.

Detection of bit errors occurring during packet transfer between two NIUs is achieved by continuous packet collision detection as discussed above, and a CRC algorithm within the serial input/output chip 408. Retransmission of aborted packets is attempted a preset number of times using a dynamically-weighted random back-off and resend algorithm. Correction of detected packet CRC errors is achieved with a NAK/retransmission algorithm.

Flow control is achieved through a combination of buffer status counters appended to control packets, and an inhibit on further transmission on receipt of a buffer overflow message. Unless such a message has been received, packets are sent without negotiation for space. Transmit buffers are cleared quickly with priority ACKs. Briefly, during transmission of a packet, all nodes except the destination node are inhibited from acquiring the network at the end of the transmission for a preset time. The destination node sends a priority ACK, NAK or overflow during the inhibit time.

Correct packet sequencing is assured by restricting each logical connection to one outstanding packet on the network. A sequence numbering algorithm is utilized by the destination NIU to reject duplicate packets.

Correction of message data errors (possibly involving multiple packets) may be selected as a network service. Messages not properly acknowledged by their destination NIU or subscriber (if host-to-host transport service has been negotiated) are identified to the initiating subscriber or application process.

To permit network management and tuning, a set of network parameters treated as variables within protocol software have been implemented. These parameters include:
  abort duration
  access inhibit duration
  buffer full time-out
  resend time-out (data link level)
  number of permitted resends.
  dead-man time-out (no data in or out)
  system crash timer
  collision back-off seed Also, a full range of communications support including short impromptu message broadcasts or datagrams and long-term scheduled processing sessions over virtual-circuits between subscribers is provided. Communications control is distributed among NIUs to avoid or minimize effects on subscribers of NIU or junction box failures. Communications protocol functions ranging from physical transfer of bit streams at the low level through high level functions such as process session control are performed as required in each NIU. Distributed network control is achieved through use of a common network protocol system design within each NIU.

Various modifications, adaptations and alterations to the present invention are of course possible in light of the above teachings, in addition to those set forth specifically. It should therefore be understood at this time that within the scope of the appended claims the invention may be practiced otherwise than as specifically described hereinabove.

APPENDIX

```
************************************************************************
*                                                                      *
*                        Interrupt routine COLL                        *
*                                                                      *
************************************************************************ coll

The interrupt routine 'coll' is activated when:
                Collision interrupts are enabled and there is activity
                on the bus, as detected by the receive logic The interrupt routine 'coll' does the following:
                (1) Checks to see if a valid full-duplex transfer is
                    in progress
                (2) If a valid full-duplex transfer is not in progress,
                    the following is done:
                    Sends an abort and then turns off the
                    transmitter
                    Disables collision interrupts
                    Turns off the transmit DMA
                    Sets 'writflag' to BLOCKED
                    Calls 'backoff( )'
                    Turns read logic back on Flags set:
                writflag = BLOCKED coll

ICL   "defns2"
        ICL   "defns3"
```

APPENDIX-continued

|  |  | EXT | _writflag, _backoff, _read_on, _collision, _dest_NIU |  |
|---|---|---|---|---|
|  |  | EXT | _readflag, _rd_start |  |
|  |  | GLBL | #coll |  |
| 10000 | #coll: |  |  |  |
| 10000 F5 |  | push | af | ; save registers |
| 10001 C5 |  | push | bc |  |
| 10002 E5 |  | push | hl |  |

* Delay long enough to allow "To NIU" and "From NIU" addresses in
* header to be read in (with interrupts enabled)

|  |  |  |  |  |
|---|---|---|---|---|
| 10003 FB |  | ei |  | ; enable interrupts |
| 10004 06 19 |  | ld | b,25 | ; delay 80 microseconds |
| 10006 10 FE | delay: | djnz | delay |  |
| 10008 F3 |  | di |  | ; disable interrupts again |

* Received interrupt indicating "To NIU" address matched this
* NIU?

| 10009 3A *0000 |  | ld | a,(_readflag) | ; 'readflag' is set by #readstrt |
|---|---|---|---|---|
|  |  |  |  | ; interrupt routine |
| 1000C FE 32 |  | cp | READING |  |
| 1000E 20 0A |  | jr | nz,abort | ; if not, abort activity on network |

* Does "From NIU" address equal the NIU being transmitted to?

| 10010 21 *0000 |  | ld | hl,_rd_start |  |
|---|---|---|---|---|
| 10013 5E |  | ld | e,(hl) | ; load E with "From NIU" address |
|  |  |  |  | ; received in header |
| 10014 3A *0000 |  | ld | a,(_dest_NIU) |  |
| 10017 BB |  | cp | e |  |
| 10018 28 48 |  | jr | z,9f | ; if equal, return from interrupt |
|  |  |  |  | ; routine to complete full-duplex |
|  |  |  |  | ; transfer---otherwise, send abort |

* Send abort and turn off transmitter

| 1001A DB 81 | abort: | in | a,(NPBD) |  |
|---|---|---|---|---|
| 1001C CBC7 |  | set | 0,a | ; set SEND ABORT high |
| 1001E D3 81 |  | out | (NPBD),a |  |
| 10020 DB 80 | 1: | in | a,(NPAD) | ; loop until ABORT' goes high |
| 10022 CB77 |  | bit | 6,a |  |
| 10024 2B FA |  | jr | z,1b |  |
| 10026 DB 81 |  | in | a,(NPBD) | ; set SEND ABORT low again |
| 10028 CB87 |  | res | 0,a |  |
| 1002A D3 81 |  | out | (NPBD),a |  |
| 1002C 3E 10 |  | ld | a,x'10 | ; reset external status interrupts |
| 1002E D3 6F |  | out | (MSBC),a |  |
| 10030 3E 03 |  | ld | a,x'05 | ; pointer to wr5 |
| 10032 D3 6F |  | out | (MSBC),a |  |
| 10034 3E 61 |  | ld | a,x'61 | ; disable transmitter (including Manchester |
| 10036 D3 6F |  | out | (MSBC),a | ;   transmit logic) |

* Disable collision interrupts

| 1003B 3E 03 |  | ld | a,3 |  |
|---|---|---|---|---|
| 1003A D3 B3 |  | out | (NPBC),a |  |

* Turn off transmit DMA

| 1003C 3E 83 |  | ld | a,x'83 | ; disable transmit DMA |
|---|---|---|---|---|
| 1003E D3 74 |  | out | (MDT),a |  |
| 10040 3E AF |  | ld | a,x'af | ; disable DMA interrupts |
| 10042 D3 74 |  | out | (MDT),a |  |

* Set 'writflag'

| 10044 3E 15 |  | ld | a,BLOCKED | ; set 'writflag' to BLOCKED |
|---|---|---|---|---|
| 10046 32 *0000 |  | ld | (_writflag),a |  |

* Call 'backoff( )' to load the backoff delay counter (a CTC channel)
* with a random value.

| 10049 CD *0000 |  | call | _backoff |  |
|---|---|---|---|---|

* Increment 32-bit collision counter

| 1004C 01 0100 |  | ld | bc,1 |  |
|---|---|---|---|---|
| 1004F 2A *0000 |  | ld | hl,(_collision) |  |
| 10052 09 |  | add | hl,bc |  |
| 10053 22 *0000 |  | ld | (_collision),hl |  |
| 10056 0B |  | dec | bc |  |
| 10057 2A *0200 |  | ld | hl,(_collision + 2) |  |
| 1005A ED4A |  | adc | hl,bc |  |
| 1005C 22 *0200 |  | ld | (_collision + 2),hl |  |

* Turn the read logic back on
*

APPENDIX-continued

```
1005F CD *0000          call    _read_on
                *
                *   Restore registers, enable interrupts, and return
                *
10062 E1        9:      pop     hl
10063 C1                pop     bc
10064 F1                pop     af
10065 FB                ei
10066 ED4D              reti
```

What is claimed is:

1. A communications network for a distributed data processing system comprising:
a plurality of network nodes, each network node comprising an incoming link on which a data signal to the corresponding network node is received and at least one network node further comprising an outgoing link on which a data signal from the at least one network node is transmitted; and
means, interposed between the network nodes, for coupling the outgoing link of a network node to the incoming links of only all the other network nodes, such that a data signal on an outgoing link of a particular network node does not enter the incoming link of the particular network node.

2. A communications network for a distributed data processing system comprising:
a plurality of network nodes, each network node comprising (a) an incoming link on which a data signal to the corresponding network node is received and (b) an outgoing link on which a data signal from the corresponding network node is transmitted; and
means, interposed between the network nodes, for coupling the outgoing link of a first network node to the incoming links of all the network nodes other than the incoming link of the first network node.

3. A communications network as in claim 2 wherein the incoming links and the outgoing links of the plurality of network nodes comprise fiberoptic links.

4. A communications network as in claim 2 wherein the incoming link of and the outgoing link of each network node comprise means for independently conveying data in opposite directions.

5. A communications network as in claim 4 wherein the coupling means comprises means for intercoupling the outgoing link of each network node to each of the incoming links of only all the other network nodes, such that the outgoing link of a particular network node is not intercoupled to the incoming link of the particular network node.

6. A communications network as in claim 5 wherein the incoming link of and the outgoing link of a network node together comprise a spatially multiplexed link pair and wherein the intercoupling means comprises at least one junction box, each such junction box having a fixed number of link pairs connectable thereto and each such junction box having means for directing data signals from the outgoing link of each link pair to the incoming links of only the other link pairs of the fixed number of link pairs.

7. A communications network as in claim 6 wherein each such junction box comprises:
a plurality of exclusive input port-output port pairs, the input port of each such pair providing an entrance for data signals from a particular network interface unit and the output port providing an exit for data signals passing to the same particular network interface unit; and
means for coupling each input port of a particular input port-output port pair to all the output ports other than the output port of the particular input port-output port pair.

8. A communications network as in claim 7 wherein the coupling means comprises gating means for connecting each output port of a particular input port-output port pair to each input port other than the input port of the particular input port-output port pair.

9. A communications network as in claim 8 wherein the gating means comprises a plurality of gates having one output line and a plurality of input lines, the output line of each gate being connected to one corresponding output port and the input lines to each gate being connected to receive data signals from all input ports other than the input port paired with the output port connected to the corresponding gate output line.

10. A communications network as in claim 7 wherein the data signals communicated to the junction box are in optical form and the coupling means couples data signals in electrical form, the input ports comprising means for converting optical data signals into corresponding electrical data signals.

11. A communications network as in claim 10 wherein the output ports comprise means for converting electrical data signals into optical data signals.

12. A communications network as in claim 11 wherein the at least one junction box comprises a plurality of junction boxes each of which has link pairs connected thereto and wherein the intercoupling means further comprises means for interconnecting the junction boxes, such that data signals on an outgoing link connected to one junction box are conveyed to each incoming link connected to the other junction boxes.

13. A communications network as in claim 2 wherein each network node further comprises a corresponding network interface unit which is connected to the incoming link and to the outgoing link of the network node and which comprises (a) a node receiver connected to receive data signals on the incoming link and (b) a node transmitter connected to transmit data signals onto the outgoing link, each transmitted data signal being addressed to at least one other network interface unit; and
wherein each network interface unit further comprises means for inhibiting data transfer in the network when the node transmitter of any given network interface unit transmits data at the same time that such given network interface unit receives data which is not addressed thereto.

14. A communications network as in claim 13 wherein each network interface unit further comprises:
means for providing full duplex data transfer between two network nodes when the two network nodes are transmitting data signals addressed to each other.

15. A communications network as in claim 6 or 12 wherein each network node further comprises a corresponding network interface unit which comprises a node receiver connected to receive data signals on the incoming link of a particular network node and a node transmitter connected to transmit data signals on the outgoing link of the particular network node, each transmitted data signal being addressed to at least one other network interface unit; and wherein each network interface unit further comprises means for inhibiting data transfer in the network when the node transmitter of any given network interface unit transmits data at the same time that such given network interface unit receives data which is not addressed thereto.

16. A communications network as in claim 15 wherein each network interface unit further comprises:

means for providing full duplex data transfer between two network nodes when the two network nodes are transmitting data signals addressed to each other.

17. A junction box for coupling a plurality of network interface units of a communications network, the junction box comprising:

a plurality of exclusive input port-output port pairs, the input port of each such pair providing an entrance for data signals from a particular network interface unit and the output port providing an exit for data signals passing to the same particular network interface unit; and means for coupling each input port of a particular input port-output port pair to all the output ports other than the output port of the particular input port-output port pair.

18. A junction box as in claim 17 wherein the coupling means comprises gating means for connecting each output port of a particular input port-output port pair to each input port other than the input port of the particular input port-output port pair.

19. A junction box as in claim 18 wherein the gating means comprises a plurality of gates having one output line and a plurality of input lines, the output line of each gate being connected to one corresponding output port and the input lines to each gate being connected to receive data signals from all input ports other than the input port paired with the output port connected to the corresponding gate output line.

20. A junction box as in claim 18 wherein the data signals communicated to the junction box are in optical form and the coupling means couples data signals in electrical form, the input ports comprising means for converting optical data signals into corresponding electrical data signals.

21. A junction box as in claim 20 wherein the output ports comprise means for converting electrical data signals into optical data signals.

22. A network interface unit for interfacing at least one host to permit communication with other hosts in a network, the network interface unit comprising:

means for transmitting data signals which have source address codes and destination address codes applied thereto;

means for receiving data signals which have corresponding source address codes and destination address codes applied thereto; and a collision detecting means, connected to the transmitting means and to the receiving means, for indicating the occurrence of a collision where both (1) the transmitting means of any network interface unit is transmitting and the receiving means thereof is receiving and (2) either (a) the source address code on the received data signal differs from the destination address code on the transmitted data signal or (b) the destination address code on the received data signal differs from the source address code of the transmitted data signal.

23. A network interface unit as defined in claim 22 being a sample of a plurality of such network interface units further comprising:

means, connected to the transmitting means and to the receiving means, for simultaneously transmitting a first data signal to and receiving a second data signal from any one other network interface unit.

24. The sample network interface unit as in claim 23 further comprising:

means for accepting received data signals which have a destination address code applied thereto that is the same as the address code identifying the sample network interface unit.

25. The sample network interface unit as in claim 24 wherein:

the collision detecting means comprises (a) means for delaying the acceptance by the signal accepting means of a received data signal only if the transmitting means of the sample network interface unit is transmitting and (b) means for determining, while the acceptance of the data signal is delayed, if the destination address code applied to the data signal received by the sample network interface unit differs from the address code which identifies the sample network interface unit, wherein such condition represents a collision.

26. The sample network interface unit as in claim 25 further comprising:

means, connected to the collision detecting means, for aborting the transfer of data on the network when a condition representing a collision is present.

27. The sample network interface unit as in claim 26 wherein the aborting means comprises:

means, connected to the collision detecting means, for transmitting an abort signal from the sample network interface unit to all other network interface units when a condition representing a collision is present.

* * * * *